(12) United States Patent
Jindal et al.

(10) Patent No.: US 11,892,948 B2
(45) Date of Patent: Feb. 6, 2024

(54) SYSTEM-ON-A-CHIP (SOC) BASED FAST PATH ENABLER FOR DATA APPLICATIONS

(71) Applicant: EdgeQ, Inc., Santa Clara, CA (US)

(72) Inventors: Ankit Jindal, Pune (IN);
Pranavkumar Govind Sawargaonkar, Pune (IN); Sriram Rajagopal, Karnataka (IN)

(73) Assignee: EdgeQ, Inc., Santa Clara, CA (US)

( * ) Notice: Subject to any disclaimer, the term of this patent is extended or adjusted under 35 U.S.C. 154(b) by 0 days.

(21) Appl. No.: 17/705,334

(22) Filed: Mar. 27, 2022

(65) Prior Publication Data

US 2023/0305959 A1    Sep. 28, 2023

(51) Int. Cl.
| | |
|---|---|
| *G06F 12/08* | (2016.01) |
| *G06F 12/0811* | (2016.01) |
| *G06F 12/0862* | (2016.01) |
| *G06F 9/30* | (2018.01) |
| *G06F 9/50* | (2006.01) |
| *G06F 15/78* | (2006.01) |

(52) U.S. Cl.
CPC ...... *G06F 12/0811* (2013.01); *G06F 9/30047* (2013.01); *G06F 9/5016* (2013.01); *G06F 12/0862* (2013.01); *G06F 15/7807* (2013.01)

(58) Field of Classification Search
CPC ............ G06F 12/0811; G06F 12/0862; G06F 9/30047; G06F 9/5016; G06F 15/7807
USPC ....................................................... 711/118
See application file for complete search history.

(56) References Cited

U.S. PATENT DOCUMENTS

| | | | |
|---|---|---|---|
| 8,738,860 B1 | 5/2014 | Griffin et al. | |
| 10,298,496 B1* | 5/2019 | Nakibly | ............... H04L 45/742 |
| 2020/0310992 A1 | 10/2020 | Cook et al. | |
| 2023/0091205 A1* | 3/2023 | Moga | .................. G06F 12/0862 |
| | | | 711/137 |

OTHER PUBLICATIONS

International search report and written opinion of the international searching authority dated Apr. 18, 2023 in related PCT application No. PCT/US22/53066, (7 pgs).

* cited by examiner

*Primary Examiner* — Hua J Song
(74) *Attorney, Agent, or Firm* — North Weber & Baugh LLP; Michael North

(57) ABSTRACT

In a typical data plane application, there is a packet dispatcher which receives packets from the underlying subsystem for distribution among various threads/processes for further processing. These threads/processes may run on various processing elements (PEs) and pass through multiple stages of processing. As new generation system-on-a-chip (SoC) architectures have multiple heterogeneous clusters with corresponding PEs, packet processing may traverse through multiple PEs in different clusters. Since latencies/performance for different clusters/PEs may be different, packet processing on the SoC may take a variable amount of time, which may lead to unpredictable latencies. The present disclosure provides embodiments to solve the problem of packet processing on heterogeneous clusters/PEs by providing a fast path enabler to the applications for SoC architecture awareness. The fast path enabler understands the cache topology of the SoC and may pre-fetch packets to the desired cache to minimize latencies for improved performance.

17 Claims, 9 Drawing Sheets

SYSTEM-ON-A-CHIP (SOC) BASED FAST PATH ENABLER FOR DATA APPLICATIONS

TECHNICAL FIELD

The present disclosure relates generally to systems and methods for data packet processing. More particularly, the present disclosure relates to systems and methods for data packet processing using one or more fast path enablers for data plane applications.

BACKGROUND

In a typical data plane application, there is a packet dispatcher which receives packets from an underlying subsystem and distributes the packets to various threads/processes for further processing. These threads/processes may run on various processing elements (PEs), e.g., processor/hardware-threads, and pass through multiple stages of processing. As new generation system-on-a-chip (SoC) architectures may have multiple heterogeneous clusters with corresponding PEs for each cluster, packet processing may traverse through multiple PEs that may be in different clusters on the same SoC. Since latencies/performance for different clusters/PEs could be different, packet processing on such an SoC generally takes a variable amount of time, which may lead to unpredictable latencies and less performance.

To avoid unpredictable latencies, certain applications execute special central processing unit (CPU) instructions. However, these instructions do not take the consideration of the SoC architecture and are generally focused on particular PEs.

Accordingly, what is needed are systems, devices, and methods to dispatch and process data packets for predictable latencies and improved performance.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
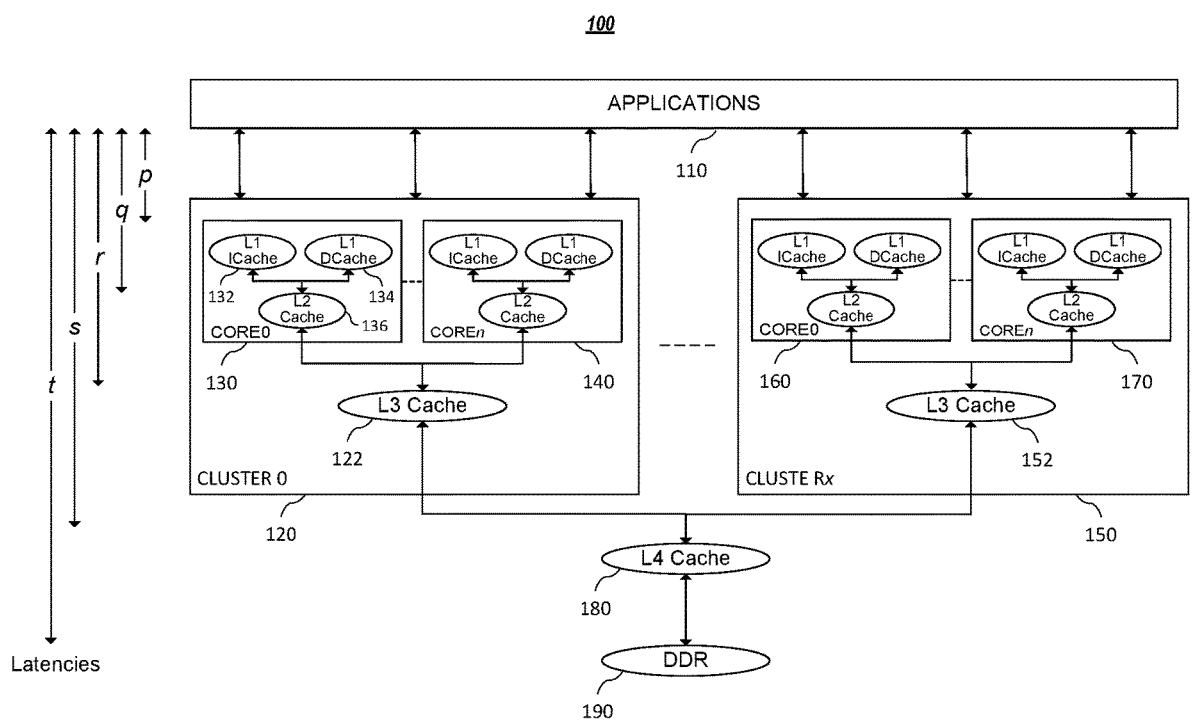
FIG. 1 ("FIG. 1") depicts a typical SoC architecture with multiple clusters.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to a system component or components into which information may be entered or otherwise recorded. The terms "data," "information," along with similar terms, may be replaced by other terminologies referring to a group of one or more bits and may be used interchangeably. The terms "packet" or "frame" shall be understood to mean a group of one or more bits. The term "frame" or "packet" shall not be interpreted as limiting embodiments of the present invention to 5G networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

A. Typical SoC Architecture

Different from traditional motherboard-based PC architecture with components separated based on function and connected through a central interfacing circuit board, SoC architecture describes an integrated circuit that incorporates various components, e.g., processor cores, memory, hardware logic, peripherals, etc., connected by communications systems such as internal data buses or networks. SoCs are widely used in various applications, including mobile computing (smartphones, tablet computers, etc.) and edge computing.

FIG. 1 depicts a typical SoC architecture 100 with multiple clusters (e.g., 120 and 150) to support the operation of application 110, according to embodiments of the present disclosure. Cluster 120 has multiple processing elements (PEs, also referred to as cores) 130 and 140. Each core may have its own level-1 instruction cache (L1 ICache) 132, level-1 data cache (L1 DCache) 134, and a level-2 Cache 136 coupled to support both the L1 ICache 132 and the L1 DCache) 134. Cluster 120 also comprises a level-3 Cache 122 that is shared across the multiple cores 130 and 140. Similarly, cluster 150 has multiple cores 160 and 170 with each core may have its own L1 ICache, L1 DCache, and a level-2 Cache. Cluster 150 also comprises a level-3 Cache 152 that is shared across the multiple cores 160 and 170. The SoC architecture 100 may also comprise a level-4 Cache 180 and a memory 190 (e.g., a double data rate (DDR) memory) shared across the multiple clusters 120 and 150 to ease data movement between clusters.

It shall be understood that the cache hierarchy shown in the figures is described in terms of distance from processing cores. A level-1 cache is referred to as on-chip split instruction and data caches that may run at the CPU or core clock speed and may be accessed in a single cycle. L1-cache usually ranges from 4 kB to 64 kB in size. A level-2 cache is typically much larger, e.g., 256 kB to 2 MB, compared to a level-1 cache. Level-2 caches may usually be accessed at some multiple of the CPU clock speed. Other levels of cache, L3 and L4 caches are progressively away from the core and also larger in cache size.

During application operation, each PE may be single hardware (HW) threaded or hyper threaded. FIG. 1 also graphically depicts various data access latencies at different cache levels. Data access latencies for an L1 cache, an L2 cache, an L3 cache, an L4 cache, and a DDR memory are represented as p, q, r, s, t respectively. Generally, $p<q<r<s<t$.

Traditionally, applications are not directly aware of the topology of the SoC system. Depending on the data storage location, one or more applications could face high latency for data accessing. Accessing data from a DDR memory may be very time-consuming and such a data accessing operation performance could be equivalent to a non-cache system. In general, DDR access latency (t) could be in hundreds of nanoseconds while accessing from far L3 and L4 caches (r & s) may be in tens of nanoseconds. Accessing data from L1 and L2 results in the best performance as latencies may be only several nanoseconds.

Figure 2:
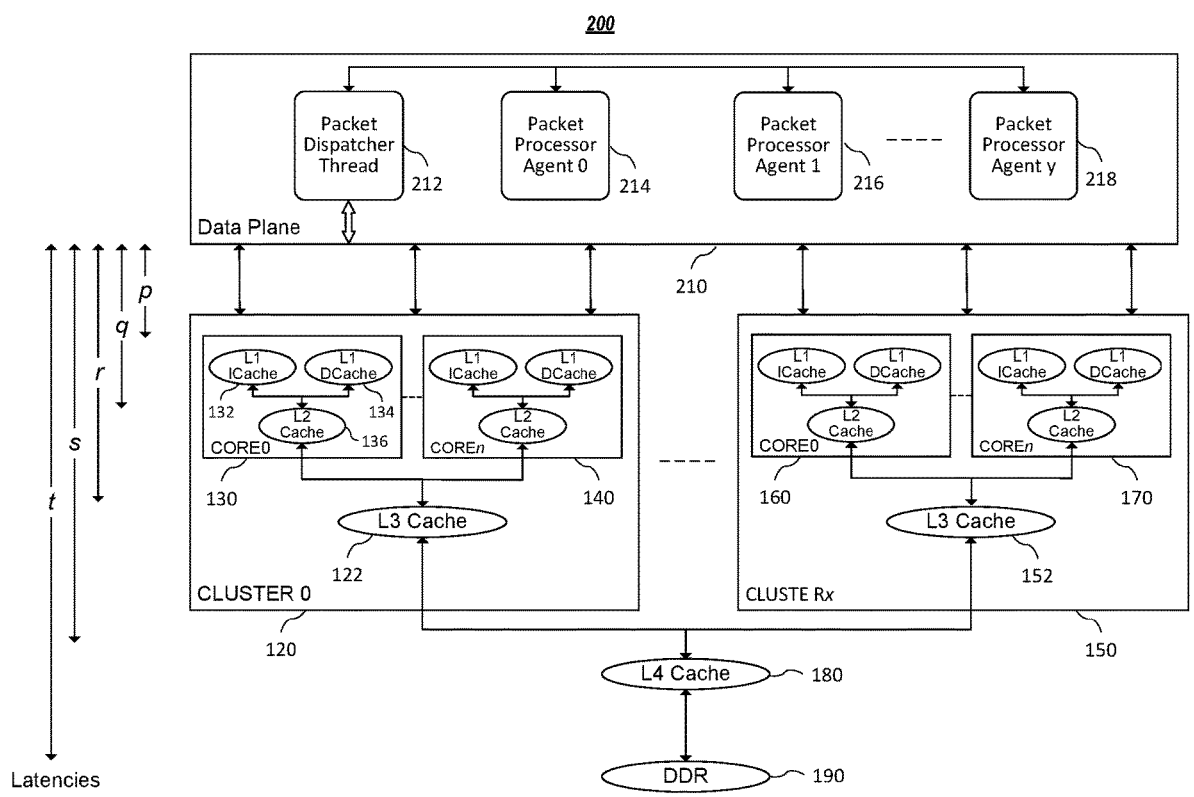
FIG. 2 depicts typical data plane application architecture with a packet dispatcher responsible for taking packets from the underlying system for distribution among multiple threads/processes for processing.

FIG. 2 depicts typical data plane application architecture 210 comprising a packet dispatcher thread 212 and multiple packet processor agents 214, 216, 218, etc., for various application operations. The packet dispatcher thread 212 is responsible for taking packets from the underlying system, e.g., network interface, etc., and distributing them among multiple threads/processes for the processing, which may be done in multiple stages via different processes/threads.

Since the applications to be implemented are not aware of the SoC architecture, some data for those applications may be in a cache requiring longer access time or coming directly from the DDR memory. For example, some data being processed by packet processor Agent y 218 may be in L1 cache 132 or 134 of Core 130 in Cluster 120, or in the DDR memory 190, which requires a longer time for access compared to a location of L1 cache in a core, e.g., core 170, designated for packet processor Agent y 218. The longer data access time would result in high latency, reduced performance, and bring indeterminism in the system.

Described in the following sections are system, device, and method embodiments to dispatch and process data packets using SoC-Aware Fast Path Enabler (SAFPE) for latency reduction and performance improvement.

B. Embodiments for SoC-Aware Data Dispatching and Processing

In this section, embodiments for data packet dispatching and processing using SAFPE are disclosed. The SAFPE may learn the SoC architecture, e.g., CPU and cache topology, at a boot time and execute instructions to pre-fetch data packets (or part of data packets) to be shared with an application from a memory to a common cache close to a core designated for running the application. Such a data pre-fetching may avoid DDR latency, which is in hundreds of nanoseconds. Furthermore, the SAFPE may pre-fetch data packets that are in an undesired cache or cluster to avoid unnecessary data movement between the clusters during application operation. In one or more embodiments, SAFPE application programming interfaces (APIs) may be used by a dispatcher thread or other processes before triggering a next level of processing.

Figure 3:
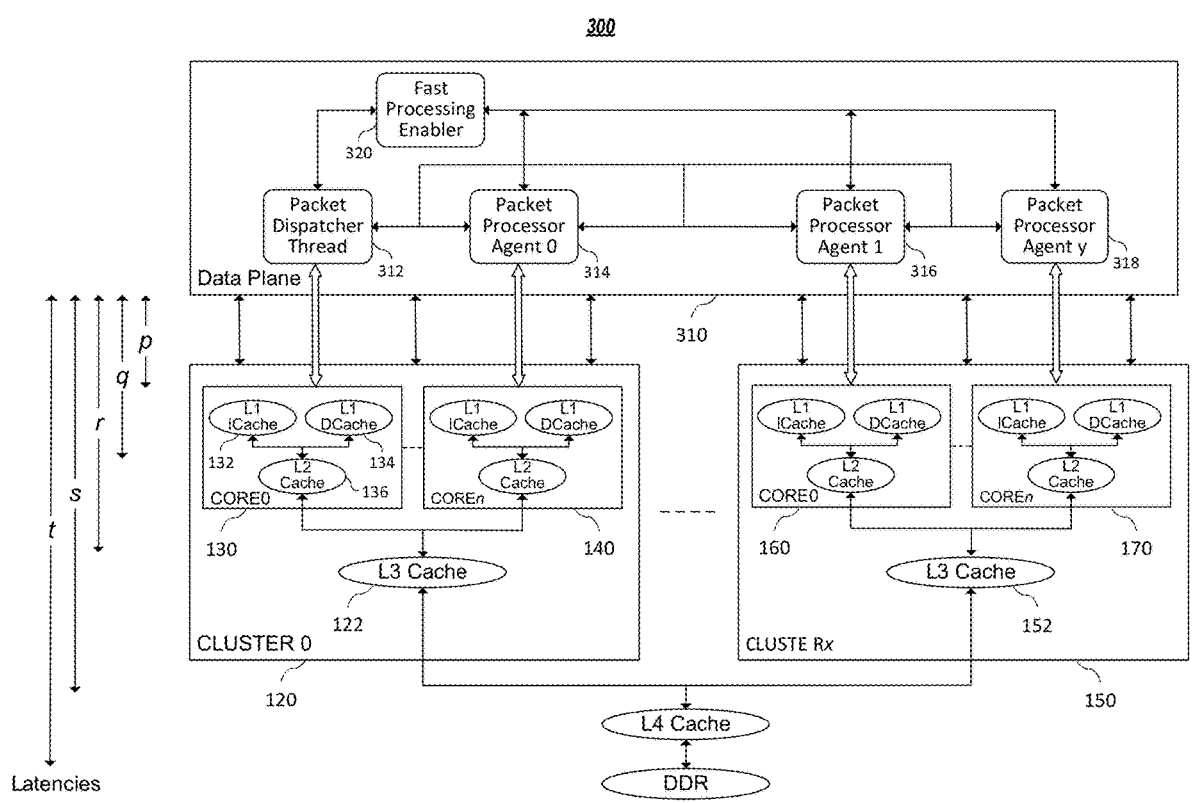
FIG. 3 depicts SoC-aware data plane application architecture with one SAFPE to reduce packet processing latencies for performance improvement, according to embodiments of the present disclosure.

FIG. 3 depicts SoC-aware data plane application architecture 310 with one SAFPE 320 to reduce packet processing latencies for performance improvement, according to embodiments of the present disclosure. The SAFPE 320 couples to the packet dispatcher thread 312 and multiple packet processor agents 314, 316, and 318. The packet dispatcher thread 312 also couples to each of the packet processor agents 314, 316, and 318 for desired data distribution. In one or more embodiments, the SAFPE 320 may learn SoC architecture information, e.g., core and cache topology, at an SoC boot time and execute instructions to pre-fetch data packets or part of data packets to be stored in a common cache, e.g., an L3 or L4 cache. Furthermore, the SAFPE 320 may also execute instructions to pre-fetch data packets that are stored in a wrong or undesired cluster into a desired cluster such that unnecessary data movement between the clusters may be avoided.

Figure 4:
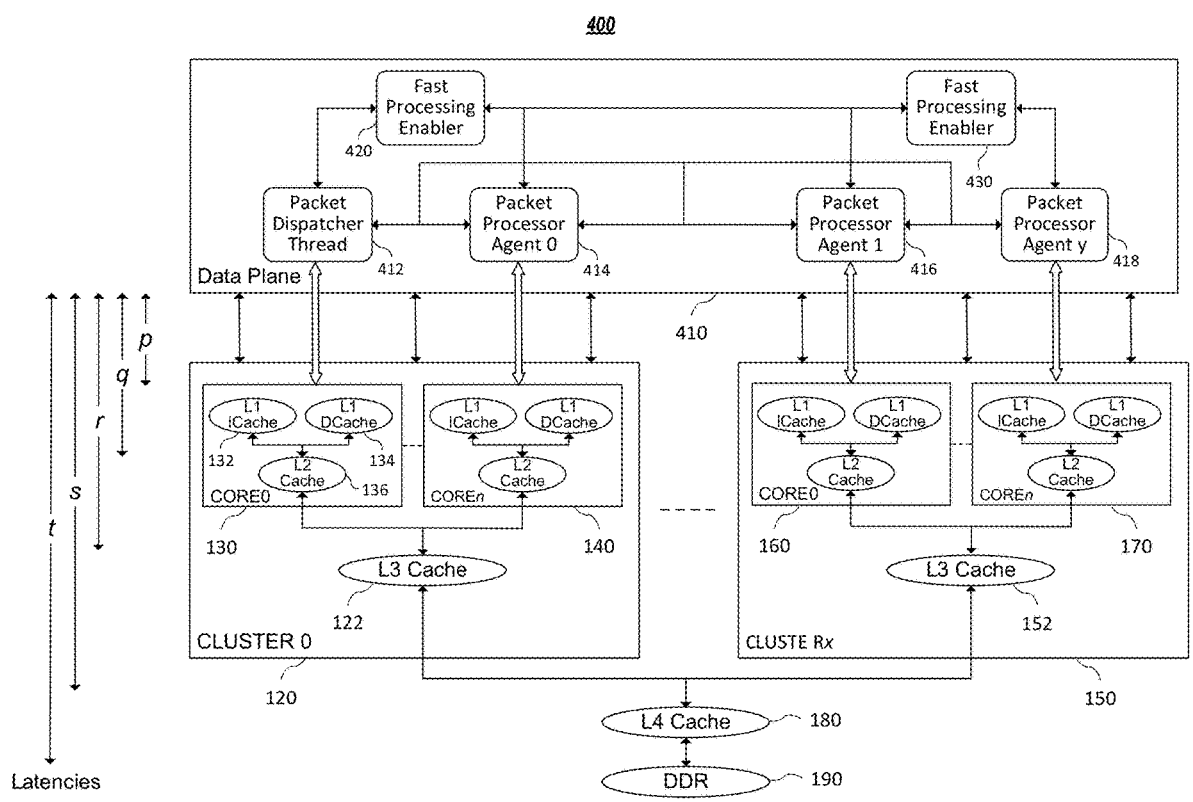
FIG. 4 depicts SoC-aware data plane application architecture with multiple SAFPEs to reduce packet processing latencies for performance improvement, according to embodiments of the present disclosure.

FIG. 4 depicts SoC-aware data plane application architecture 410 with multiple SAFPEs to reduce packet processing latencies for performance improvement, according to embodiments of the present disclosure. Different from FIG. 3, the SoC-aware data plane application architecture 410 comprises multiple SAPFEs, e.g., a first SAFPE 420 and a second SAFPE 430, coupling to the packet dispatcher thread 412. Each of the multiple SAPFEs may couple to one or more corresponding packet processor agents. As shown in FIG. 4, the first SAFPE 420 couples to the packet processor agent 414, while the second SAFPE 430 couples to the packet processor agents 416 and 418.

Figure 5:
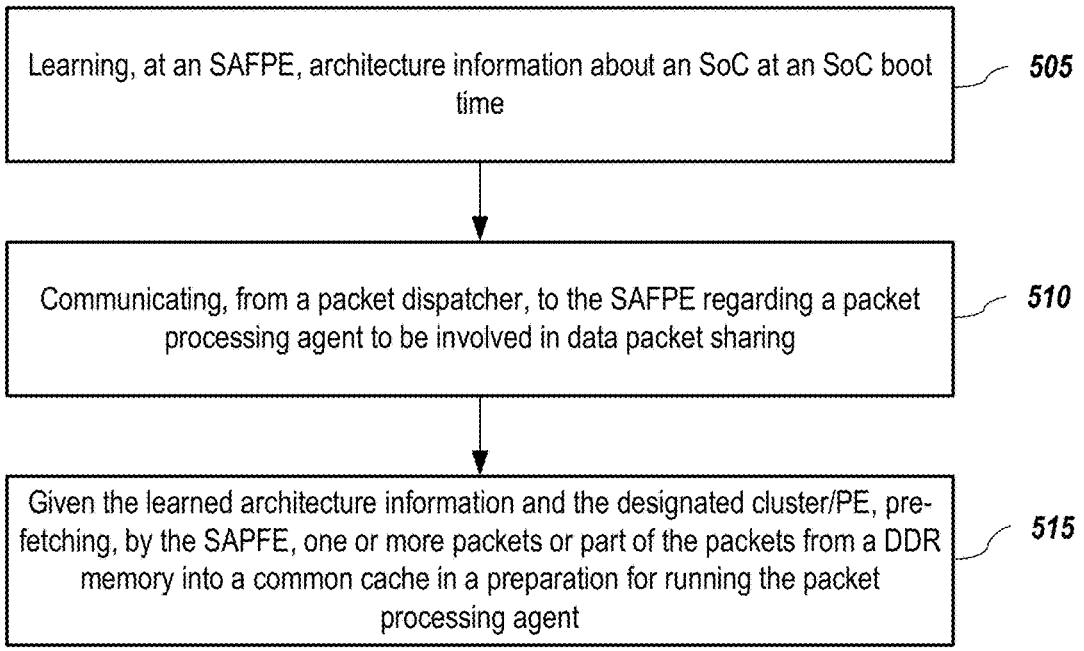
FIG. 5 depicts a general process for packet processing using SAFPE, according to embodiments of the present disclosure.

FIG. 5 depicts a general process for packet processing using SAFPE, according to embodiments of the present disclosure. In step 505, an SAFPE learns architecture information, e.g., processing core and cache topology, about an SoC at an SoC boot time. In step 510, a packet dispatcher communicates to the SAFPE regarding a packet processing agent to be involved in data packet sharing. In one or more embodiments, the packet dispatcher also informs the SAPFE information of a cluster and/or a PE to be designated for running the packet processing agent. In step 515, given the learned architecture information and the designated cluster/PE, the SAFPEs executes instructions to pre-fetch, from a DDR memory, one or more packets or part of the packets into a common cache in a preparation for running the packet processing agent. Without the involvement of SAFPE, the packet dispatcher typically fetches data packets from the DDR with a data access time in hundreds of nanoseconds, which may bring an excessive latency when the packet processing agent is running.

Figure 6:
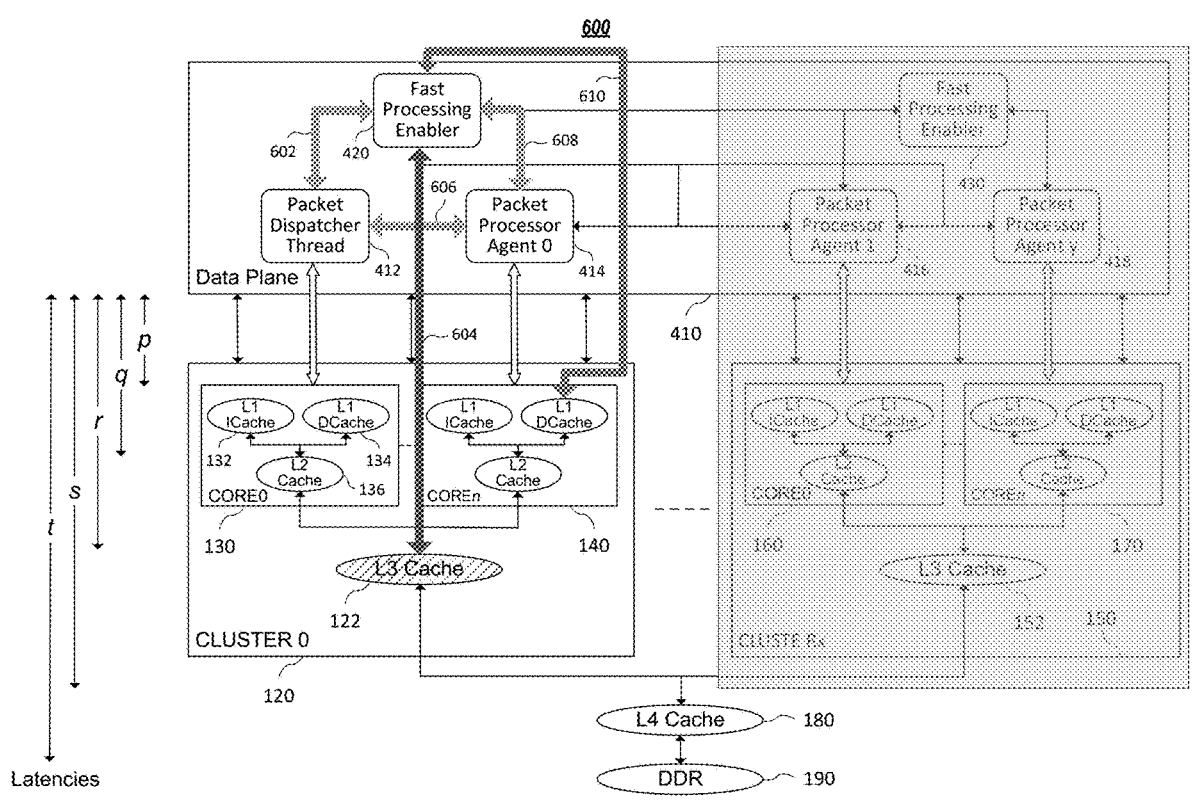
FIG. 6 graphically depicts a first scenario of data packet processing with the SAFPE, according to embodiments of the present disclosure.
Figure 8:
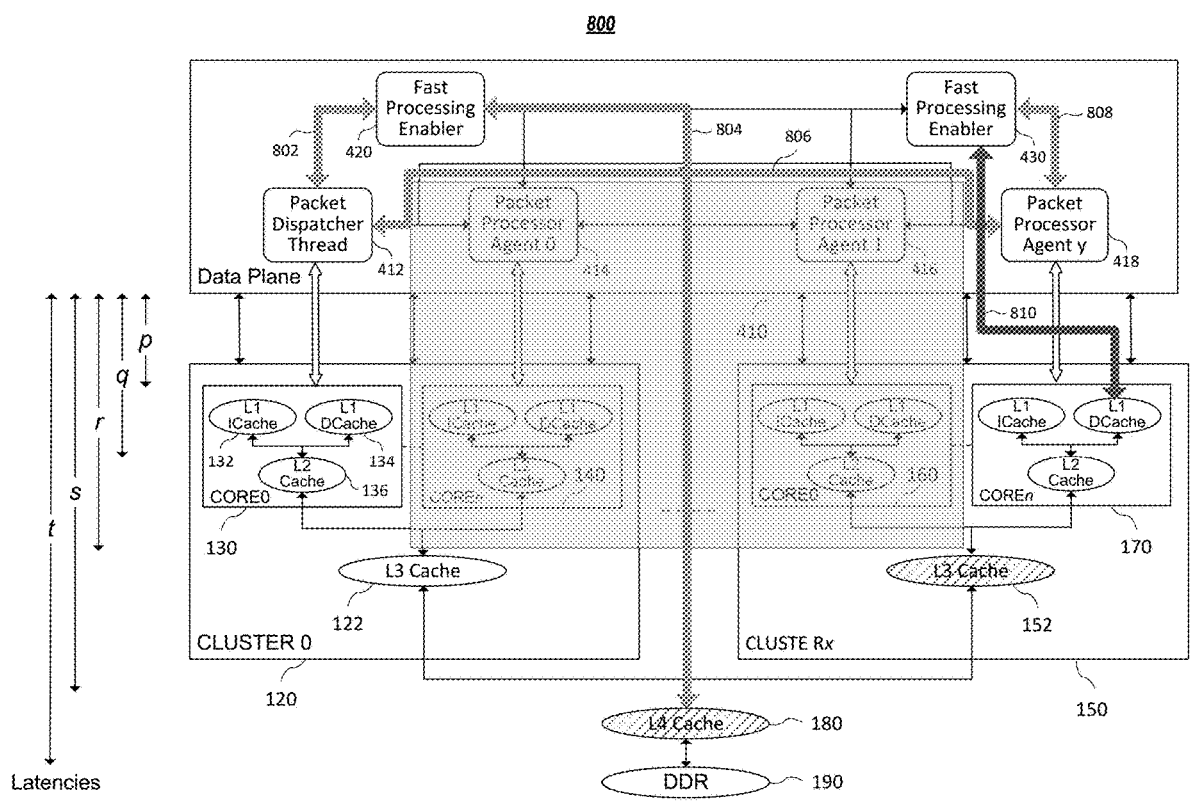
FIG. 8 graphically depicts a second scenario of data packet processing with the SAFPE, according to embodiments of the present disclosure.

In one or more embodiments, the one or more packets pre-fetched to the common cache may then be pre-fetched fully or partially into a private cache of the PE or core designated for running the packet processing agent, such that the packet processing agent may access the data packets in the private cache with minimum data access latency when running on the designate core or PE. The common cache may be an L3 cache shared across multiple cores in the cluster to which the designated core belongs as shown in FIG. 6, or an L4 cache shared across multiple cores clusters including the cluster to which the designated core belongs as shown in FIG. 8. The private cache of the PE or core may be an L1 data cache of the designated core.

Figure 7:
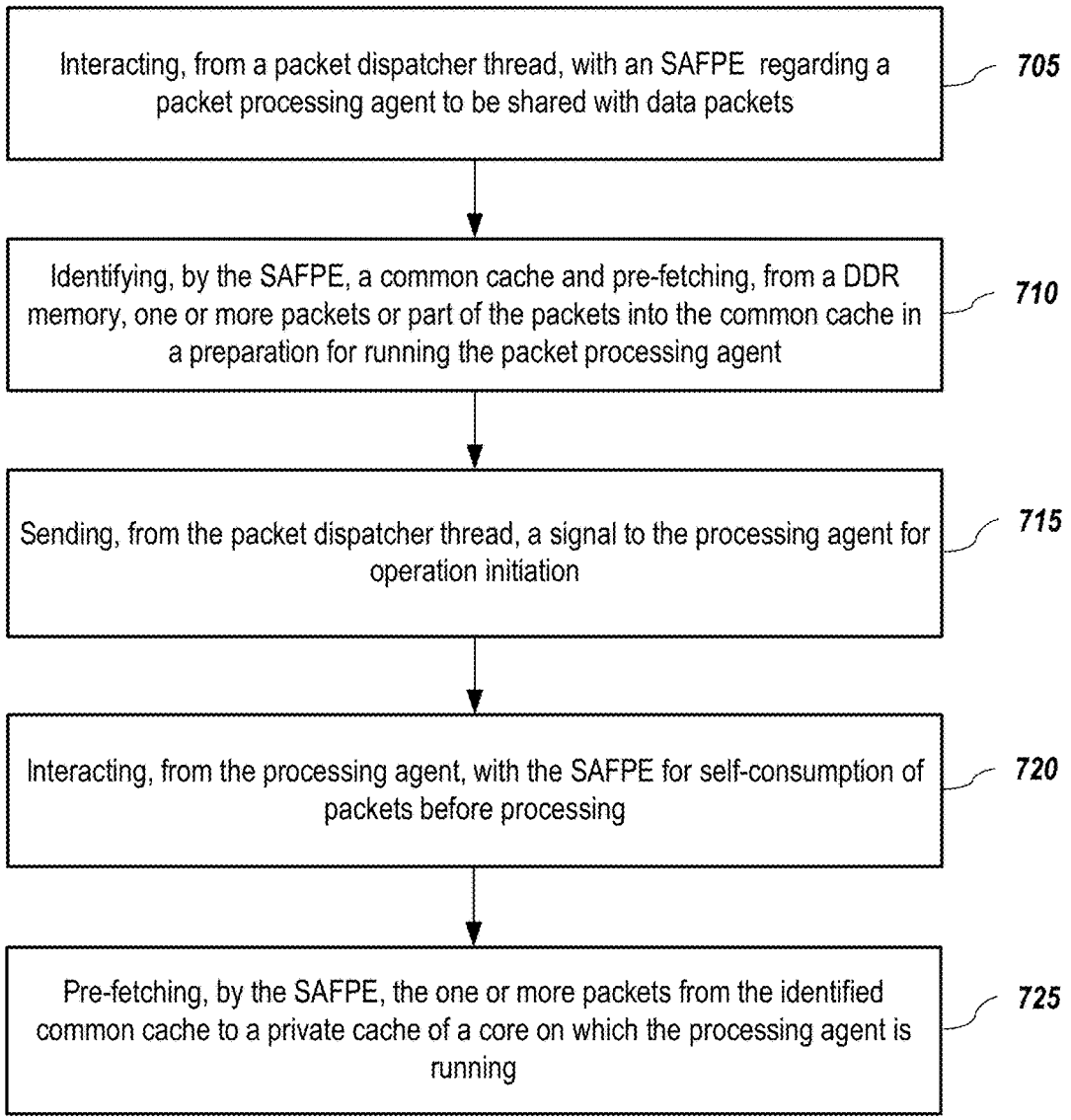
FIG. 7 depicts a process of data packet processing with the SAFPE for the first scenario of data packet processing, according to embodiments of the present disclosure.

FIG. 6 graphically depicts a first scenario of data packet processing with the SAFPE and FIG. 7 depicts a process of data packet processing with the SAFPE for the first scenario of data packet processing, according to embodiments of the present disclosure. In this first scenario, the packet dispatcher thread 412 decides to give packets to the packet processing agent 0 414. In step 705 (also graphically presented as process 602 in FIG. 6), the packet dispatcher thread 412 interacts with the SAFPE 420 regarding the packet processing agent (e.g., agent 414) to be shared with data packets. In one or more embodiments, the packet dispatcher thread 412 also informs resource allocation information, e.g., cluster and/or core designated to run the packet processing agent 0 414, to the SAFPE 420. Alternatively, such resource allocation information may be from another source, e.g., a resource allocation agent, coupled to the SAFPE 420.

In step 710 (also graphically presented as process 604 in FIG. 6), given the SoC architecture information and resource allocation information of the processing Agent 0, the SAFPE 420 identifies a common cache (e.g., the L3 cache 122 of Cluster 0 120) and pre-fetches, from a DDR memory, one or more packets or part of the packets into the common cache in a preparation for running the packet processing agent. In step 715 (also graphically presented as process 606 in FIG. 6), the packet dispatcher thread 412 sends a signal to the processing agent 0 414 for operation initiation. In step 720 (also graphically presented as process 608 in FIG. 6), the processing agent 0 414 interacts with the SAFPE 420 for self-consumption of packets before processing. In other words, the processing agent 0 414 indicates to the SAFPE 420 one or more packets desired for consumption before processing. In step 725 (also graphically presented as process 610 in FIG. 6), the SAFPE 420 pre-fetches the one or more packets from the identified common cache (L3 cache 122) to a private cache (e.g., an L1 DCache) of a core on which the processing agent 0 414 is running. In FIG. 6, cluster, cores, and packet processor agents uninvolved in packet pre-fetching are masked, compared to involved cluster and cores, for attention focus.

Figure 9:
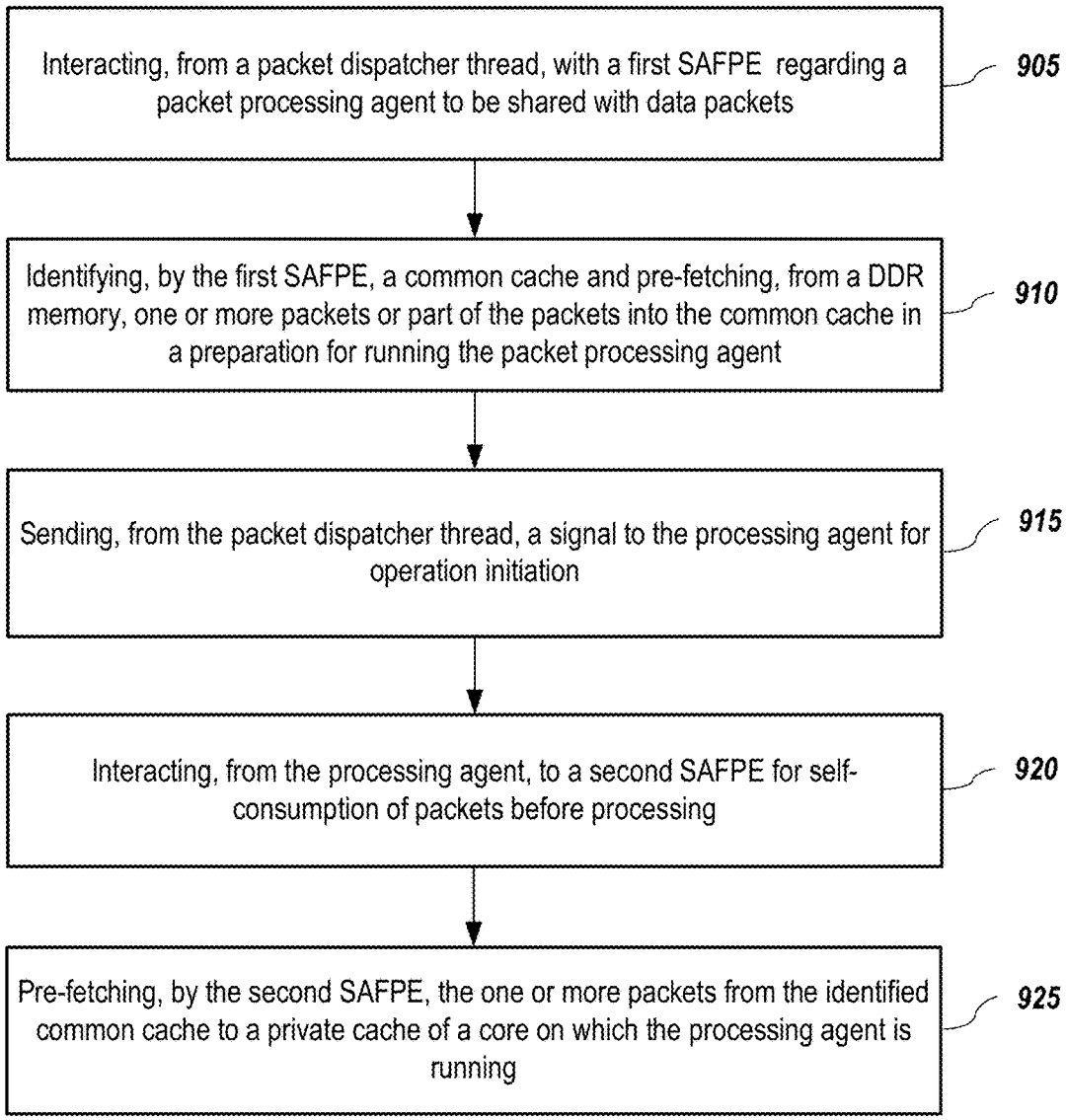
FIG. 9 depicts a process of data packet processing with the SAFPE for the second scenario of data packet processing, according to embodiments of the present disclosure.

FIG. 8 graphically depicts a second scenario of data packet processing with the SAFPE and FIG. 9 depicts a process of data packet processing with the SAFPE for the second scenario of data packet processing, according to embodiments of the present disclosure. In the second scenario, the packet dispatcher thread 412 decides to give packets to the packet processing agent y 418. In step 905 (also graphically presented as process 802 in FIG. 8), the packet dispatcher thread 412 interacts with the SAFPE 420 regarding the application (packet processing agent y 418 to be shared with data packets. In one or more embodiments, the packet dispatcher thread 412 also informs resource allocation information, e.g., cluster and/or core designated to run the packet processing agent y 418, to the SAFPE 420. Alternatively, such resource allocation information may be from another source, e.g., a resource allocation agent, coupled to the SAFPE 420.

In step 910 (also graphically presented as process 804 in FIG. 8), given the SoC architecture information and resource allocation information of the processing Agent y, the SAFPE 420 identifies a common cache (e.g., the L4 cache 180) and pre-fetches, from a DDR memory, one or more packets or part of the packets into the common cache in a preparation for running the packet processing agent. In the second scenario of data packet processing, the packet processing agent y 418 is allocated to core 170 in cluster Rx 150, which is different from the cluster (e.g., cluster 0 120) handled by the SAFPE 420. In this case, the common cache is the L4 cache 180 across the multiple clusters.

In step 915 (also graphically presented as process 806 in FIG. 6), the packet dispatcher thread 412 sends a signal to the processing agent y 418 for operation initiation. In step 920 (also graphically presented as process 808 in FIG. 6), the processing agent y 414 interacts with the SAFPE 430 for self-consumption of packets before processing. In other words, the processing agent y 418 indicates to the SAFPE 430 one or more packets desired for consumption before processing. In step 925 (also graphically presented as process 810 in FIG. 8), the SAFPE 430 pre-fetches the one or more packets from the identified common cache (the L4 cache 180) to a private cache (e.g., an L1 DCache) of a core 170 on which the processing agent y is running. In one or more embodiments, the one or more packets to be pre-fetched from the L4 cache 180 are larger than the cache size of the L1 DCache of a core 170, the SAFPE 430 may first pre-fetch a first part of the one or more packets to the L1 DCache of a core 170, and then pre-fetch a second part or the rest of the one or more packets to a closer common cache, e.g., L3 cache 152 of the cluster 150. Similar to FIG. 6, cluster, cores, and packet processor agents not involved in packet pre-fetching in FIG. 8 are masked, compared to involved clusters and cores, for attention focus.

Aspects of the present disclosure may be encoded upon one or more non-transitory computer-readable media with instructions for one or more processors or processing units to cause steps to be performed. It shall be noted that one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skills in the relevant arts. Examples of tangible computer-readable media include, for example, magnetic media such as hard disks, floppy disks, and magnetic tape; optical media such as CD-ROMs and holographic devices; magneto-optical media; and hardware devices that are specially configured to store or to store and execute program code, such as application-specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher-level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for data packet processing comprising:
    learning, at a fast path enabler, architecture information about a system-on-a-chip (SoC), the SoC comprises multiple clusters with each cluster comprising multiple cores;
    communicating, from a packet dispatcher thread, to the fast path enabler resource allocation information of the SoC regarding a packet processing agent to be involved in data packet sharing; and
    pre-fetching, by the fast path enabler, one or more packets from a memory into a common cache, identified among multiple common caches in the SoC based on the learned architecture information and the resource allocation information, in a preparation for running the packet processing agent.

2. The method of claim 1 wherein the architecture information about the SoC comprises core and cache topology of the SoC.

3. The method of claim 1 wherein the resource allocation information comprises a location of a cluster and a core in the cluster designated to run the packet processing agent.

4. The method of claim 3 wherein the common cache is a level-3 cache of the cluster designated to run the packet processing agent.

5. The method of claim 3 wherein the common cache is a level-4 cache shared across multiple clusters including the cluster designated to run the packet processing agent.

6. The method of claim 1 further comprising:
    pre-fetching, by the fast path enabler or another fast path enabler coupled to the packet processing agent, at least a part of the one or more packets from the common cache to a private cache of a core designated to run the packet processing agent.

7. A system for data packet processing comprising:
    a system-on-a-chip (SoC) comprising multiple clusters with each cluster comprising multiple cores; and
    a data plane application architecture comprising:
        a plurality of packet processing agents to run data plane applications;
        a packet dispatcher thread coupled to the plurality of packet processing agents, the packet dispatcher thread takes packets and distributes data packets among the plurality of packet processing agents for the processing; and
        a fast path enabler coupled to the packet dispatcher thread, the fast path enabler is configured for:
            learning architecture information about the SoC;
            receiving from the packet dispatcher thread resource allocation information of the SOC for a packet processing agent, among the plurality of packet processing agents, to be involved in data packet sharing; and
            pre-fetching, one or more packets from a memory into a common cache, identified among multiple common caches in the SoC based on the learned architecture information and the resource allocation information, in a preparation for running the packet processing agent.

8. The system of claim 7 wherein the architecture information about the SoC comprises core and cache topology of the SoC.

9. The system of claim 8 further comprising:
  interacting the packet processing agent with the fast path enabler or another fast path enabler coupled to the packet processing agent for self-consumption of packets before processing; and
  pre-fetching, by the fast path enabler or another fast path enabler coupled to the packet processing agent, at least a part of the one or more packets from the common cache to a private cache of a core designated to run the packet processing agent.

10. The system of claim 9 wherein the private cache of the core designated to run the packet processing agent is a level-1 data cache.

11. The system of claim 7 wherein the resource allocation information comprises a location of a cluster and a core in the cluster designated to run the packet processing agent.

12. The system of claim 11 wherein the common cache is a level-3 cache of the cluster designated to run the packet processing agent, or a level-4 cache shared across multiple clusters including the cluster designated to run the packet processing agent.

13. A non-transitory computer-readable medium or media comprising one or more sequences of instructions which, when executed by at least one processor, causes steps for data packet processing comprising:
  learning, at a fast path enabler, architecture information about a system-on-a-chip (SoC), the SoC comprises multiple clusters with each cluster comprising multiple cores;
  communicating, from a packet dispatcher thread, to the fast path enabler resource allocation information of the SoC regarding a packet processing agent to be involved in data packet sharing; and
  based on the learned architecture information and the resource allocation information for the packet processing agent, pre-fetching, by the fast path enabler, one or more packets from a memory into a common cache, identified among multiple common caches in the SoC based on the learned architecture information and the resource allocation information, in a preparation for running the packet processing agent.

14. The non-transitory computer-readable medium or media of claim 13 wherein the architecture information about the SoC comprises core and cache topology of the SoC.

15. The non-transitory computer-readable medium or media of claim 13 wherein the resource allocation information comprises a location of a cluster and a core in the cluster designated to run the packet processing agent.

16. The non-transitory computer-readable medium or media of claim 13 wherein the common cache is a level-3 cache of a cluster designated to run the packet processing agent, or a level-4 cache shared across multiple clusters including the cluster designated to run the packet processing agent.

17. The non-transitory computer-readable medium or media of claim 13 further comprising one or more sequences of instructions which, when executed by at least one processor, causes steps to be performed comprising:
  interacting the packet processing agent with the fast path enabler or another fast path enabler coupled to the packet processing agent for self-consumption of packets before processing; and
  pre-fetching, by the fast path enabler or the another fast path enabler coupled to the packet processing agent, at least a part of the one or more packets from the common cache to a private cache of a core designated to run the packet processing agent.

* * * * *